United States Patent [19]

Sauerbrunn

[11] 4,299,498
[45] Nov. 10, 1981

[54] FLASHING REACTOR

[75] Inventor: Robert D. Sauerbrunn, Seaford, Del.

[73] Assignee: E. I. Du Pont de Nemours and Company, Wilmington, Del.

[21] Appl. No.: 99,621

[22] Filed: Dec. 3, 1979

[51] Int. Cl.³ .............................................. B28C 7/12
[52] U.S. Cl. ...................................... 366/76; 122/40; 165/138; 366/148; 366/149; 366/154; 366/339; 528/335; 528/336
[58] Field of Search .................... 366/83–86, 366/144, 148, 154, 168, 173, 177, 318, 336–339, 76, 149; 528/335, 336; 165/138; 122/40

[56] References Cited

U.S. PATENT DOCUMENTS

| | | | |
|---|---|---|---|
| 2,689,839 | 9/1954 | Heckert | 528/336 |
| 3,357,955 | 12/1967 | Bryan | 528/335 |
| 3,509,107 | 4/1970 | Brignac | 528/487 |
| 3,789,584 | 2/1974 | Iwasyk et al. | 55/201 |
| 3,800,985 | 4/1974 | Grout et al. | 222/146 H |
| 3,929,725 | 12/1975 | Davis | 260/45.75 C |
| 3,960,820 | 6/1976 | Pinney | 528/335 |
| 4,090,261 | 5/1978 | Iwasyk | 366/83 |

FOREIGN PATENT DOCUMENTS 1093451 12/1967 United Kingdom .

Primary Examiner—Philip R. Coe
Assistant Examiner—Timothy F. Simone

[57] ABSTRACT

A flashing reactor wherein the initial single pipe carrying the ingredients within the flasher shell is connected within the shell to a flow splitter which in turn is connected to at least two other pipes arranged for parallel flow. In order to avoid an abrupt change in pressure and flow rate downstream from the splitter, the cross-sectional area of the branch pipes immediately adjacent the splitter is approximately equal to the cross-sectional area of the single pipe feeding of the splitter. The branch pipes are then increased in diameter until the combined cross-sectional area of the branch pipes is increased to up to twice the area of the single pipe feeding the splitter.

4 Claims, 3 Drawing Figures

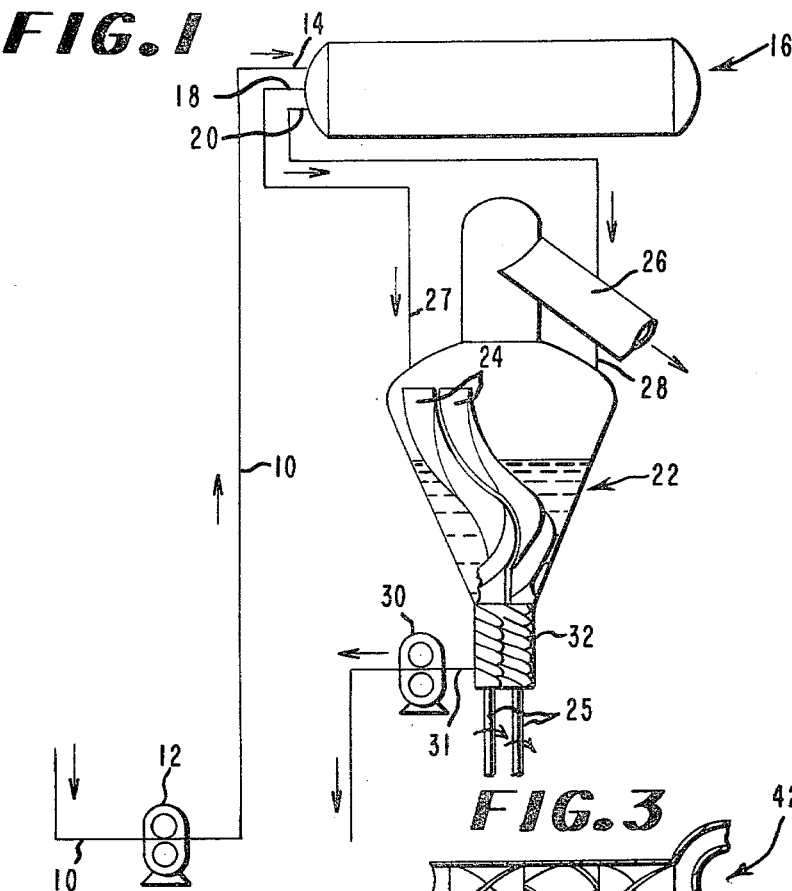
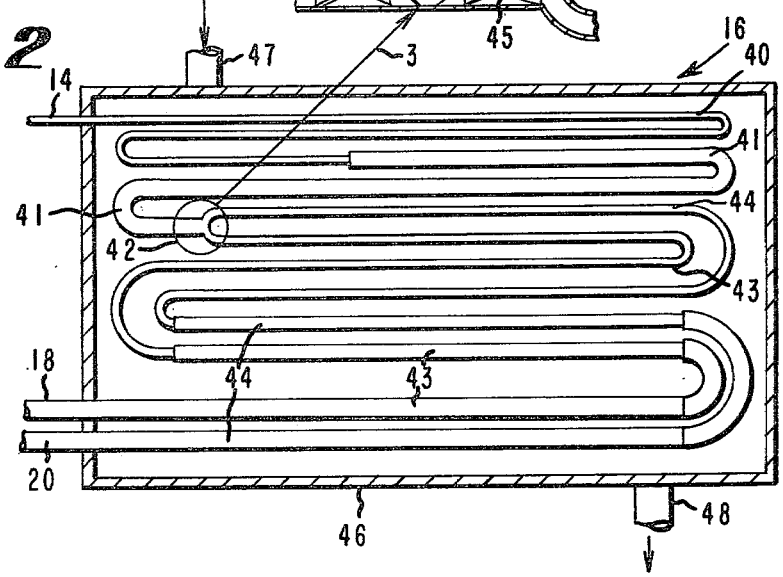

FLASHING REACTOR

BACKGROUND OF THE INVENTION

This invention relates to polymerization apparatus for manufacturing synthetic condensation polymers. More particularly it concerns a flashing reactor to be used with continuous polymerizers for nylon polymer of high capacity.

Flashing reactors or flashers as they are usually called consist of a series of sections of pipe of successively increased diameter surrounded by a heating jacket such as described by Heckert in U.S. Pat. No. 2,689,839 or by Iwasyk et al in U.S. Pat. No. 3,789,584. Such single pipe flashers when used with high capacity continuous polymerizers suffer from operational deficiencies which include polymer gelation, high levels of entrained nylon aerosols due to high steam velocities needed to reduce the degree of polymer gelation in the larger pipe sizes, and lower relative viscosity (RV) for the polymer exiting the flasher as a result of short residence time due to high steam velocities. Polymer gelation develops when the flasher pipe diameter gets above about 3½″ Schedule 40 I.P.S. The polymer is not symmetrically distributed about the pipe wall but, due in part to gravity action, tends to become concentrated at the bottom of the pipe. If high velocity steam is used to attempt to hold and distribute the polymer more evenly about the pipe wall, there is an increase in the amount of polymer which becomes entrained in the steam as aerosols and the RV of the polymer decreases because of shorter residence time in the flasher. The increase in aerosols enhances the buildup of polymer deposits in the vent system of the finisher to which the flasher discharge pipe is connected. This leads to more frequent shutdown of the whole system for vent cleaning.

SUMMARY OF THE INVENTION

The flasher of the present invention, characterized by multiple polymer flow pipes arranged in parallel and multiple polymer outlets to the finisher, is especially useful with high capacity continuous polymerizers. In this type flasher the initial single pipe carrying the flowing ingredients, e.g., polymer, water, steam, within the flasher shell is connected at some desired point within the shell to a flow splitter whereby the single pipe is connected to at least two other pipes (branches) arranged for parallel flow. In order to avoid an abrupt change in pressure and flow rate downstream from the splitter, the cross-sectional area of the branch pipes immediately adjacent the splitter is equal or approximately equal to the cross-sectional area of the single pipe feeding the splitter. The branch pipes are then gradually increased in diameter until the combined cross-sectional area of the branch pipe system increases up to about twice that of the single pipe feeding the splitter. Selection of pipe sizes, number of branch pipes, and branching locations (splitters) is dependent on, e.g., the polymer throughput handled, the desired shear rate of the polymer as it leaves the flasher, the RV desired, and the steam velocity used. For high polymer throughput (e.g., 7,000 lb/hr), high RV polymer, decreased aerosol entrainments, and lower steam velocities, splitting of the polymer flow within the flasher occurs at a greater distance from the flasher exit than when throughput is, e.g., 4,000 lb/hr at otherwise equivalent conditions.

If desired a static mixer may be located in the pipe upstream of the splitter.

BRIEF DESCRIPTION OF THE DRAWINGS

FIG. 1 is a schematic of a flashing reactor of the invention connected to a finisher.

FIG. 2 is a schematic of the flashing reactor of FIG. 1.

FIG. 3 is an enlargement in cross section of the area designated by the arrow 3 in FIG. 2

DETAILED DESCRIPTION OF THE PREFERRED EMBODIMENT

Referring to FIG. 1, a partially polymerized diamine-dicarboxylic acid composition is withdrawn from a source (not shown) through pipeline 10 by means of pump 12 and forced by means of pump 12 into the inlet 14 of flasher 16 from which it proceeds through the flasher to outlets 18,20 into finisher 22. The finisher 22 includes two co-rotating interengaging helical screw elements 24 supported on shafts 25. The finisher contains a vent 26 and a pair of polymer inlets 27,28 connected to outlets 18 and 20 of flasher 16. Discharge pump 30 is connected to outlet 31 at the base 32 of the finisher for forwarding polymer for further processing. A finisher of this type is described more fully by Iwasyk in U.S. Pat. No. 4,090,261.

As best shown in FIGS. 2 and 3, the flasher 16 includes two sections 40,41 of single pipe of successively increasing diameter connected to a splitter 42 whereby the single pipe section 41 is connected to two branch pipes 43 and 44 arranged for parallel flow which then lead in successively increased diameters to outlets 18,20 of the flasher. The sum of the cross-sectional areas of the branch pipes 43,44 adjacent the splitter 42 is approximately equal to the cross-sectional area of pipe 41 and the branch pipes are increased in diameter until the combined cross-sectional area of both branch pipes 43,44 approaches twice that of pipe 41. A static mixer 45 such as described by Grout et al in U.S. Pat. No. 3,800,985 is positioned in pipe 41 just upstream of splitter 42. Pipes 40, 41, 43 and 44 are surrounded by a heating jacket 46 which receives heating fluid at inlet 47 and discharges it from outlet 48.

For a flasher handling 7,000–10,000 lb/hr of product, the maximum useful pipe size is about 3½″ Schedule 40 I.P.S., for either pre-splitter feed pipe or each post-splitter branch pipe.

I claim:

1. In a continuous polymerization system that includes a flasher connected to a polymer finisher, the improvement comprising: said flasher having an inlet and a plurality of outlets; one section of pipe leading from said inlet to a location intermediate said inlet and said outlets; a splitter connected to said one section of pipe at its terminal end at said location for splitting said one section of pipe into a plurality of paths; a plurality of sections of pipe each of successively increased diameter connected between said splitter and said outlets, said outlets being connected to said finisher; and a heating jacket surrounding said one section of pipe, said splitter and said plurality of sections of pipe.

2. The system of claim 1, there being two outlets, said splitter splitting said one section of pipe into two paths.

3. The system of claim 2, including a static mixing element located in said one section of pipe upstream of said splitter.

4. The system of claim 2 wherein the sum of the cross-sectional areas of said plurality of pipes is up to twice the cross-sectional area of said one section of pipe near its terminal end.

* * * * *